(12) United States Patent
Kumar et al.

(10) Patent No.: US 9,898,246 B2
(45) Date of Patent: Feb. 20, 2018

(54) PLAYBACK ZONE REPRESENTATIONS

(71) Applicant: Sonos, Inc., Santa Barbara, CA (US)

(72) Inventors: Abhishek Kumar, Santa Barbara, CA (US); Robert Andrew Lambourne, Santa Barbara, CA (US)

(73) Assignee: Sonos, Inc., Santa Barbra, CA (US)

( * ) Notice: Subject to any disclaimer, the term of this patent is extended or adjusted under 35 U.S.C. 154(b) by 0 days.

(21) Appl. No.: 15/170,607

(22) Filed: Jun. 1, 2016

(65) Prior Publication Data

US 2016/0274863 A1    Sep. 22, 2016

Related U.S. Application Data

(63) Continuation of application No. 14/194,257, filed on Feb. 28, 2014, now Pat. No. 9,408,008.

(51) Int. Cl.
*G06F 17/00* (2006.01)
*G06F 3/16* (2006.01)
(Continued)

(52) U.S. Cl.
CPC ............ *G06F 3/165* (2013.01); *G06F 3/0481* (2013.01); *G11B 27/10* (2013.01); *H04R 27/00* (2013.01); *H04R 2227/005* (2013.01)

(58) Field of Classification Search
CPC ...................................... G06F 3/165
See application file for complete search history.

(56) References Cited

U.S. PATENT DOCUMENTS 5,440,644 A    8/1995  Farinelli et al.
5,761,320 A    6/1998  Farinelli et al.
(Continued)

FOREIGN PATENT DOCUMENTS

EP    1389853 A1    2/2004
WO    0153994       7/2001
(Continued)

OTHER PUBLICATIONS

International Bureau, International Preliminary Report on Patentability dated Sep. 15, 2016, issued in connection with International Application No. PCT/US2015/017947, filed on Feb. 27, 2015, 9 pages.

(Continued)

*Primary Examiner* — Joseph Saunders, Jr.
(74) *Attorney, Agent, or Firm* — McDonnell Boehnen Hulbert & Berghoff LLP

(57) ABSTRACT

Method and systems are provided for displaying playback zone representations in a controller interface for a media playback system. An example implementation involves a computing device receiving a command to display representations of playback zones in a media playback system. After receiving the command, the computing system determines that (i) each zone of a first subset of playback zones is associated with media content and (ii) each zone of a second subset of playback zones is not associated with media content. In response to determining that each zone of the first subset of playback zones is associated with media content, the computing system displays an expanded format representation of each playback zone in the first subset and in response to determining that each zone of the second subset of playback zones is not associated with media content, displays a collapsed format representation of each playback zone in the second subset.

20 Claims, 5 Drawing Sheets

(51) Int. Cl.
G11B 27/10 (2006.01)
H04R 27/00 (2006.01)
G06F 3/0481 (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,290,603 B1 | 10/2012 | Lambourne |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2005/0289475 A1 | 12/2005 | Martin et al. |
| 2007/0142944 A1 | 6/2007 | Goldberg et al. |
| 2008/0066102 A1 | 3/2008 | Abraham et al. |
| 2010/0281369 A1 | 11/2010 | Bell et al. |
| 2010/0299639 A1 | 11/2010 | Ramsay et al. |
| 2013/0080955 A1 | 3/2013 | Reimann et al. |
| 2014/0033035 A1 | 1/2014 | Crow et al. |
| 2014/0176298 A1 | 6/2014 | Kumar et al. |
| 2014/0176299 A1 | 6/2014 | Kumar et al. |
| 2014/0181199 A1 | 6/2014 | Kumar et al. |
| 2014/0181654 A1 | 6/2014 | Kumar et al. |
| 2014/0181655 A1 | 6/2014 | Kumar et al. |
| 2014/0181656 A1 | 6/2014 | Kumar et al. |
| 2014/0181977 A1 | 6/2014 | Hammond |
| 2015/0248268 A1 | 9/2015 | Kumar et al. |

FOREIGN PATENT DOCUMENTS

| | | |
|---|---|---|
| WO | 03093950 A2 | 11/2003 |
| WO | 2011100115 A1 | 8/2011 |

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
International Searching Authority, International Search Report and Written Opinion dated May 19, 2015, issued in connection with International Application No. PCT/US2015/017947, filed on Feb. 27, 2015, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Nov. 19, 2015, issued in connection with U.S. Appl. No. 14/194,257, filed Feb. 28, 2014, 14 pages.
Notice of Allowance dated Apr. 6, 2016, issued in connection with U.S. Appl. No. 14/194,257, filed Feb. 28, 2014, 5 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, Extended Search Report dated Feb. 16, 2017, issued in connection with European Application No. 15754907.2, 10 pages.
Japanese Patent Office, Office Action dated Mar. 3, 2017, issued in connection with Japanese Patent Application No. 2016-554868, 2 pages.

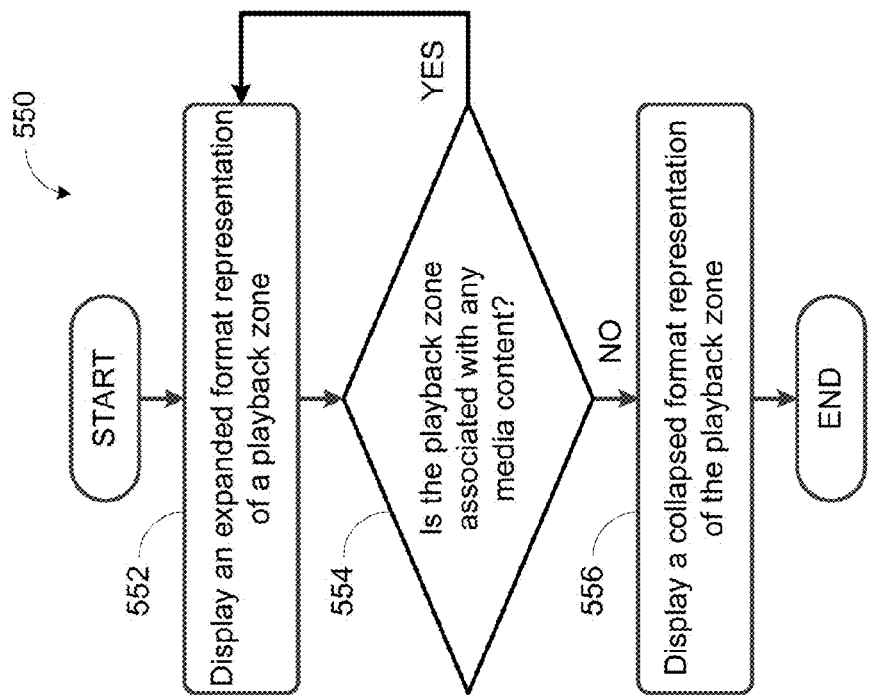

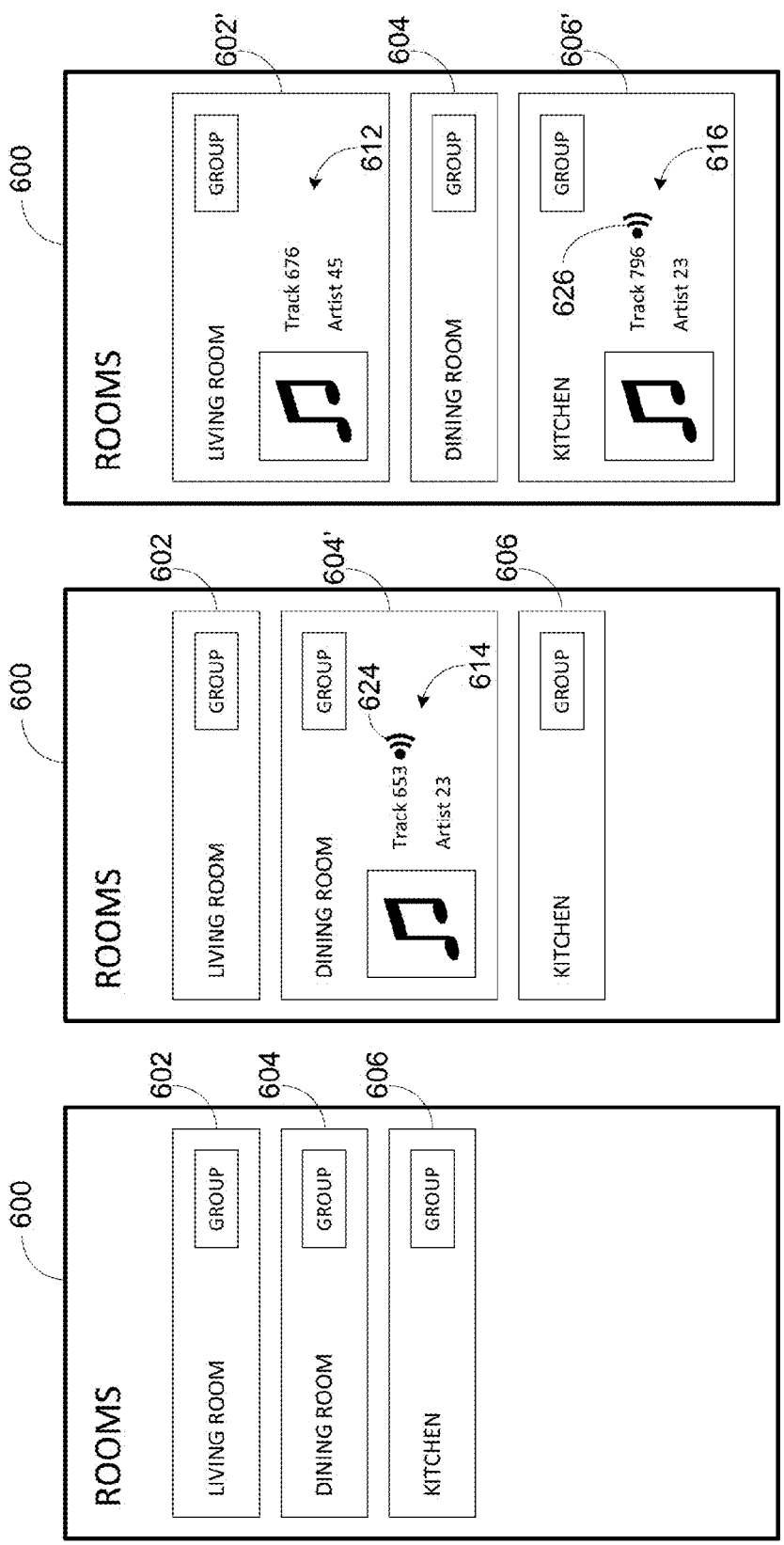

PLAYBACK ZONE REPRESENTATIONS

CROSS-REFERENCE TO RELATED APPLICATIONS

This application claims priority under 35 U.S.C. § 120 to, and is a continuation of, U.S. non-provisional patent application Ser. No. 14/194,257, filed on Feb. 28, 2014, entitled "Playback Zone Representations," which is incorporated herein by reference.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 5A shows a first example flow diagram for displaying playback zone representations;

FIG. 5B shows a second example flow diagram for displaying playback zone representations;

FIG. 6A shows a first example of playback zone representations;

FIG. 6B shows a second example of playback zone representations; and

FIG. 6C shows a third example of playback zone representations.

Figure 1:
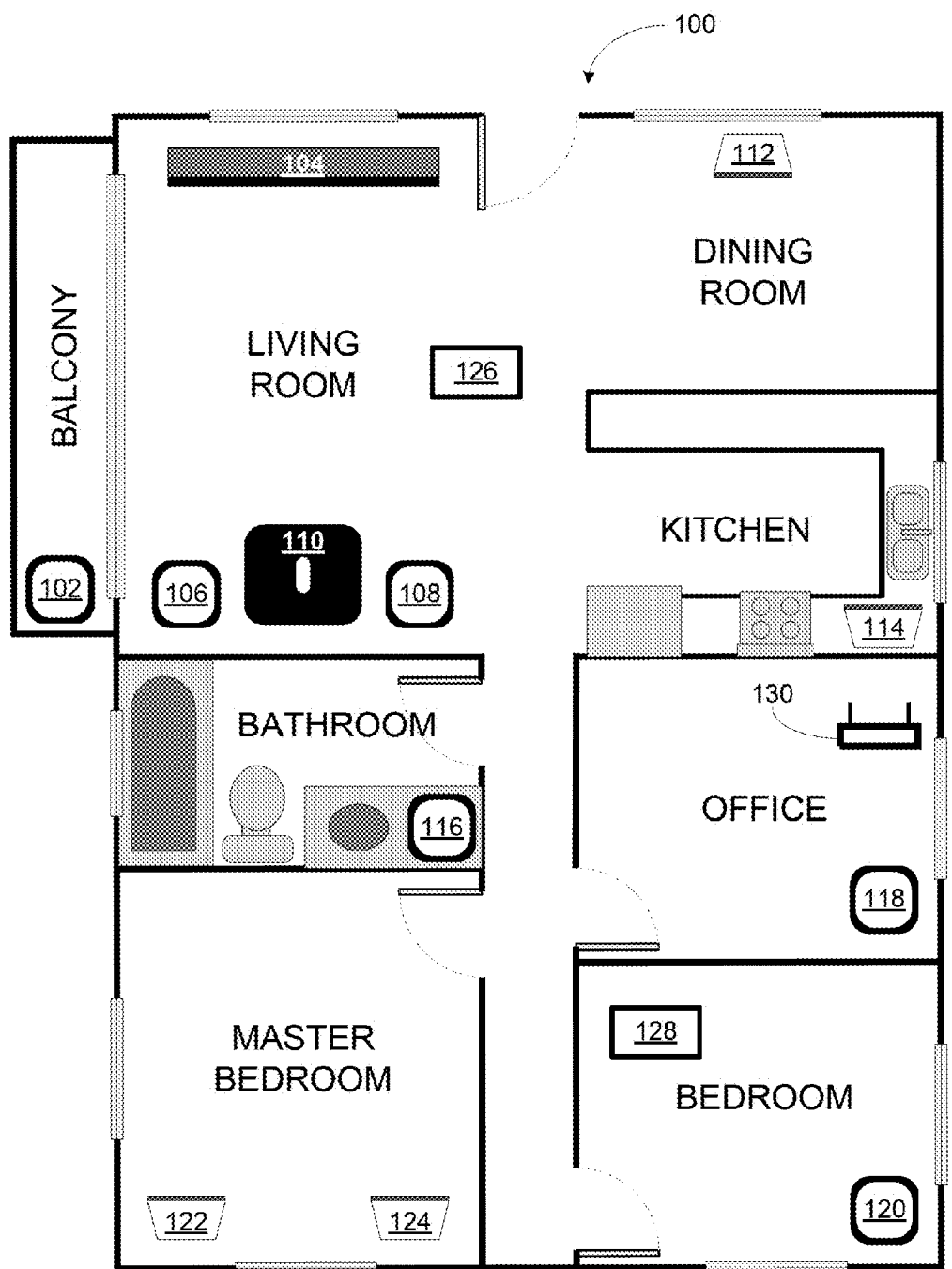
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve displaying a representation of a playback zone based on whether the respective playback zone is associated with media content. In particular, a representation according to a collapsed format may be displayed when the playback zone is not currently associated with media content, and a representation according to an expanded format may be displayed when the playback zone is associated with media content. The playback zone may be one of multiple playback zones in a media playback system such as that discussed below in section II. To navigate between the playback zones in the media playback system, a user may interact with a controller interface that provides selectable playback zone representations for each playback zone, or group of playback zones. In some examples, displaying the representation of the playback zone based on whether the playback zone is associated with media content may allow the user to more easily navigate between playback zones when interacting with the user interface.

In an embodiment, the playback zone may be represented according to two different formats, depending on whether the playback zone is associated with any media content. For discussions herein, an association between media content and a playback zone may include the media content being played in the playback zone, the media content being paused in the playback zone, the media content being in a queue associated with the playback zone, or the media content cached to be played in the playback zone, but not necessarily playing, among others. Additional examples are provided below.

In the case media content is associated with the playback zone, the representation of the playback zone on the controller interface may include both a first region displaying the name of the playback zone as well as a second region displaying meta data for the media content associated with the playback zone. This representation may be referred to as a full or expanded format representation of the playback zone.

Alternatively, if no media content is associated with the playback zone, the representation of the playback zone may include the first region displaying the name of the particular playback zone, but not the second region displaying metadata for media content, which would otherwise be left blank. This representation may be referred to as a partial or collapsed format representation of the playback zone.

The representation of the playback zone may dynamically switch between the expanded format and the collapsed format as media content becomes associated or disassociated with the playback zone over time. In some cases, such difference in representations of playback zones with and without associated media content may help the user using the controller interface to quickly identify which playback zones have associated media content and which playback zones do not. In some cases, the difference in representations may help the user quickly identify which playback zones are playing media content and which playback zones are idle.

In addition, displaying a collapsed format representation for a playback zone that has no associated media content, rather than displaying a blank second region in the expanded format representation may provide a more efficient display of playback zone representations on the controller interface. The more efficient display of playback zone representations may in some cases allow more playback zone representations to be displayed on the controller interface at a time and reduce the amount of scrolling required for the user using the controller interface to navigate between the different playback zones in the media playback system.

As indicated above, the present application involves displaying playback zone representations in a controller interface for a media playback system. In one aspect, a method is provided. The method involves displaying a collapsed format representation of a playback zone in a media playback system, and based on a determination that the playback zone is associated with media content, displaying an expanded format representation of the playback zone. The expanded format representation of the playback zone is larger than the collapsed format representation of the playback zone.

In another aspect, a device is provided. The device includes a processor and memory having stored thereon instructions executable by the processor to cause the device to perform functions. The functions include displaying an expanded format representation of a playback zone in a media playback system, and based on a determination that the playback zone is not associated with media content, displaying a collapsed format representation of the playback zone. The collapsed format representation of the playback zone is smaller than the expanded format representation of the playback zone.

In yet another aspect, a non-transitory computer readable memory is provided. The non-transitory computer readable memory has stored thereon instructions executable by a computing device to cause the computing device to perform functions. The functions include displaying a representation of a first playback zone in a media playback system according to a collapsed format, and displaying a representation of a second playback zone in the media playback system. The representation of the second playback zone is in a position directly below the representation of the first playback zone. The functions also include based on a determination that the first playback zone is associated with media content, (i) displaying an updated representation of the first playback zone according to an expanded format, and (ii) moving the representation of the second playback zone to be displayed in a position directly below the updated representation of the first playback zone. The expanded format is larger than the collapsed format.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
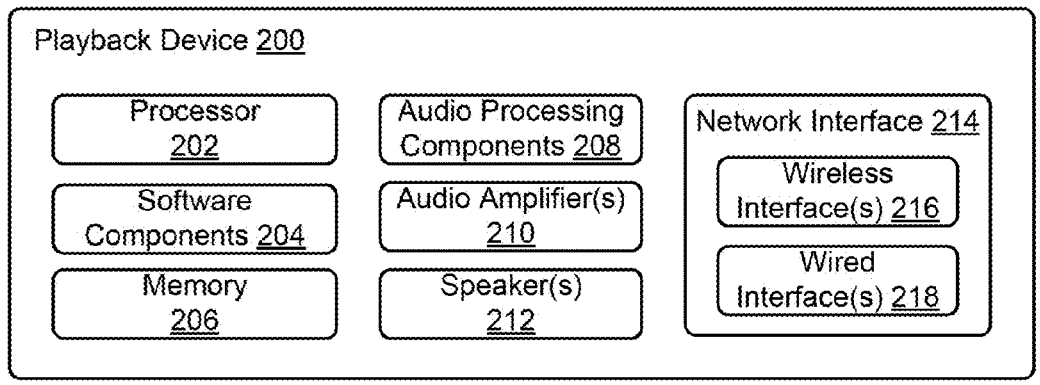
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
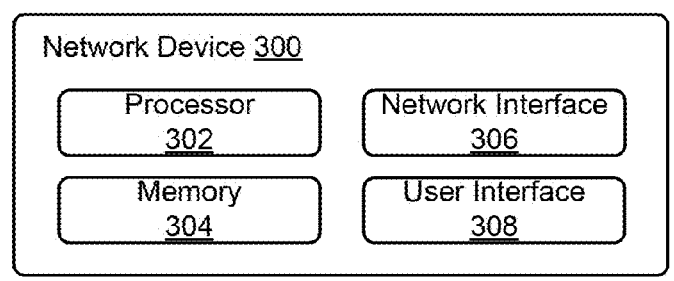
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
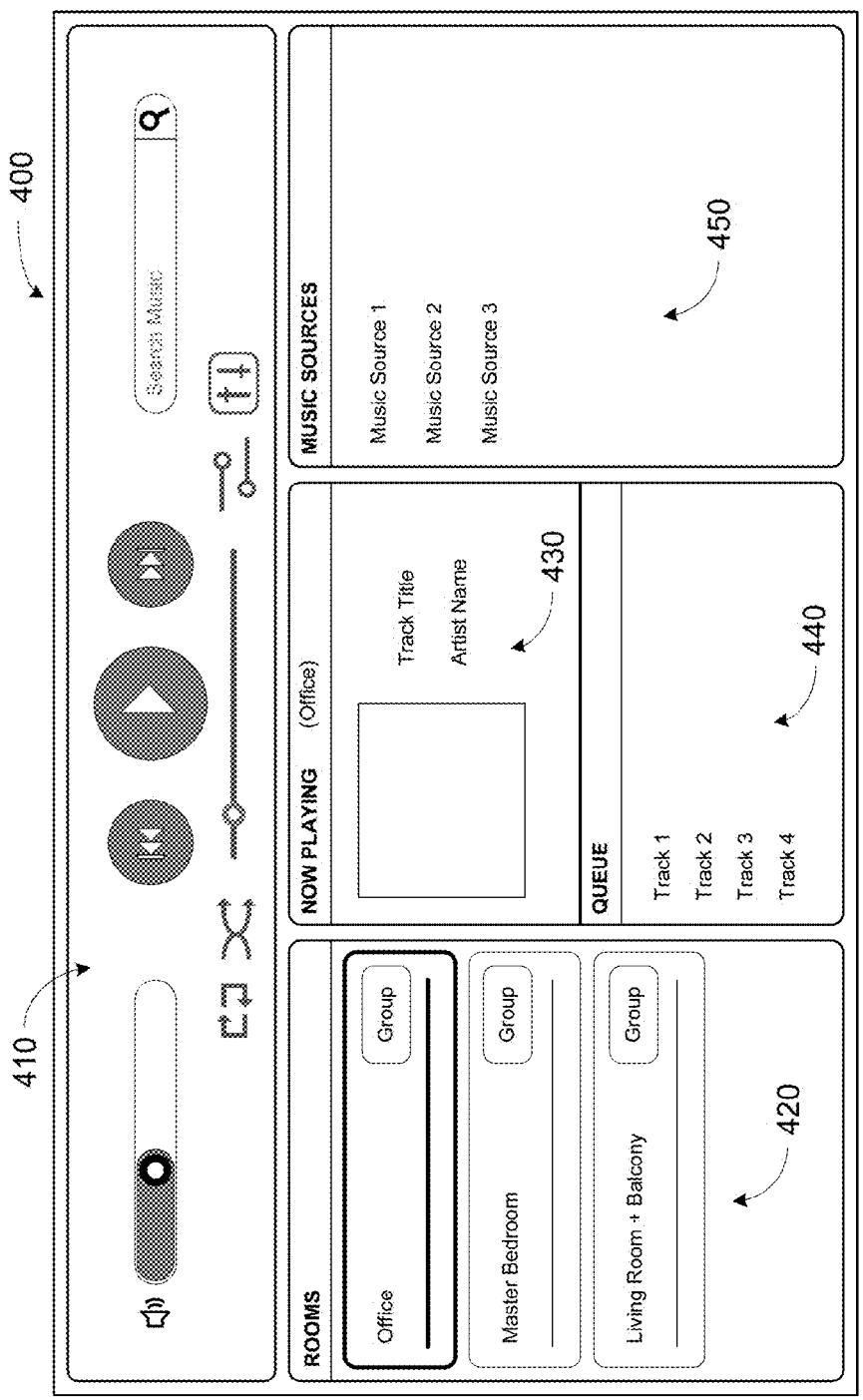
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Displaying Playback Zones

As discussed above, embodiments described herein involve displaying playback zone representations in a controller interface for a media playback system. Method 500 shown in FIG. 5A presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5A may represent circuitry that is wired to perform the specific logical functions in the process.

At block 502, the method 500 involves displaying a collapsed format representation of a playback zone in a media playback system, such as that described herein. FIG. 6A shows a first example of playback zone representations 602, 604, and 606 on an interface 600. As shown, the zone representation 604 is displayed in a position directly below the zone representation 602, and the zone representation 606 is in a position directly below the zone representation 604.

In one case, referring back to the controller interface 400 of FIG. 4, the interface 600 may be an example version of the playback zone region 420. In another case, the interface 600 may represent one of multiple tabs or views of a controller interface. For instance, if the controller interface is provided on a device having a smaller display, such as a mobile phone, the device may display only one of the different regions of the controller interface 400 at a time. In such a case, the user may access the other regions by interacting with the controller interface. As such, the interface 600 may be provided on the controller interface when the user interacts with the controller interface to view and access the different playback zones in the media playback system.

As shown in FIG. 6, each of the playback zone representations 602, 604, and 606 displays a name of each respective playback zone. In this example, playback zone representation 602 may represent a "Living Room" zone, playback zone representation 604 may represent a "Dining Room" zone, and playback zone representation 606 may represent a "Kitchen" zone. Each of the playback zone representations 602, 604, 606 may also include a "group" icon such as that described previously in connection to FIG. 4. As playback zone representations 602, 604, 606 each provide just the respective playback zone names and the "group" icon, the playback zone representations 602, 604, 606 are referred to as collapsed format representations in the context of the present application. In some embodiments, as indicated previously, playback zone representations may be provided according to the collapsed format if no media content is associated with the playback zone.

At block 504, the method 500 involves determining whether the playback zone is associated with any media content. In one example, the association between the playback zone and media content may include media content being played and/or paused by one or more playback devices in the playback zone. In another example, the association between the playback zone and media content may include a playback queue associated with the playback zone being populated with media content. In yet another example, the association between the playback zone and media content may include media content being cached for playback by the playback zone. For instance, if playback of streaming media content or Internet radio by the playback zone is paused with no additional media content in the playback queue associated with the playback zone, the playback zone is still associated with the media content that has been paused. Other examples are also possible.

In one example, the association between the playback zone and media content may be a result of a user accessing the playback zone via the controller interface to cause the playback zone to play media content. For instance, the playback zone representations 602, 604, and 606 of the interface 600 may each be selected to modify media content and/or playback configurations associated with the respective playback zones. As such, the user may select the playback zone representation 604 to cause the Dining Room zone to play media content. In another example, the association between the playback zone and media content may be a result of the playback zone playing media content based on predetermined instructions. For instance, a media playback alarm may have been set up such that media content will be played in the Dining Room zone over a certain time frame. Other examples are also possible.

In one example, determining whether the playback zone is associated with any media content may involve receiving from a component in the media playback system, such as a playback device in the playback zone, data indicating that the playback zone is associated with media content. In one case, the controller device providing the controller interface may send a message to the playback device in the playback zone to retrieve a state variable of the playback device, and may determine based on the state variable whether the playback zone is associated with media content.

In another example, the controller device may maintain a record of state variables for some or all of the playback devices and/or playback zones in the media playback system. For instance, the controller device may receive an updated state variable each time a state variable is modified. As such, determining whether a playback zone is associated with any media content may involve accessing the locally stored state variable associated with the playback zone, or one or more devices in the playback zone. Other examples are also possible.

As shown in FIG. 5A, if at block 504 a determination is made that the playback zone is not associated with media content, the method 500 may proceed back to block 502 where a collapsed format representation of the playback zone is provided. If on the other hand, a determination is made that the playback zone is associated with media content, the method 500 may proceed to block 506.

At block 506, the method 500 involves displaying an expanded format representation of the playback zone. As indicated by block 504 shown in FIG. 5A, the display of the expanded format representation of the playback may be based on, or in response to a determination that the playback zone is associated with media content. FIG. 6B shows a second example of playback zone representations 602, 604', and 606 on the interface 600. In this example, a determination that the Dining Room zone is associated with media content may have been made. Accordingly, the representation of the Dining Room zone may be the expanded format representation 604' of the Dining Room zone.

The expanded format representation 604' may be larger than the collapsed format representation 604 shown in FIG. 6A, and may include a first region displaying the name "Dining Room" and the "group" icon similar to that of the collapsed format representation 604 in FIG. 6A, as well as a second region displaying information 614 associated with the media content associated with the Dining Room zone. The information 614 associated with the media content may include one or more of album art, track name, track artist, and album name, among others. As shown in FIG. 6B, the expanded format representation 604' displays information 614 associated with the media content having example track title "Track 653," by example artist "Artist 23," along with example album art associated with the media content. In some examples, the expanded format representation 604' may be of a different color scheme to further differentiate from the collapsed format representations 602 and 606.

Also shown in the expanded format representation 604' is an icon 624 indicating that "Track 653" is currently playing in the Dining Room zone, and not just in a playback queue associated with the Dining Room zone, or cached for playback by a playback device in the Dining Room zone. Other example graphical indications in addition to, or instead of the icon 624 may also be provided to indicate that the Dining Room zone is playing media content. Like zone representations 602, 604, and 606, the expanded format representation 604' may also be selectable to modify media content and/or playback configurations associated with the associated playback zone, which in this case is the Dining Room zone.

As shown in FIG. 6B, the expanded format representation 604' is displayed directly below the zone representation 602, similar to how the collapsed format representation 604 is displayed directly below the zone representation 602 in FIG. 6A. Similarly, the format representation 606 of the Kitchen zone may be displayed directly below the expanded format representation 604'. However, because the expanded format representation 604' is larger than the collapsed format representation 604 of FIG. 6A, the zone representation 606 in FIG. 6B may be displayed at a position that is relatively lower on the interface 600 than the zone representation 606 is on the interface 600 shown in FIG. 6A.

The top-to-bottom order in which the zone representations are displayed on an interface may be based on one or more variables. In one example, the zone representations may be ordered according to a chronological order in which the playback zones were established. In another example, the zone representations may be ordered alphabetically based on names of the playback zones. In a further example, the zone representations may be ordered based on which playback zone most frequently plays media content, or most recently played media content. In yet another example, the zone representations may be ordered based on whether the playback zone is associated with any media content. For instance, zone representations displayed according to the expanded format due to an association with media content may be provided first on the controller interface. Other examples, including various combinations of the above mentioned examples, are also possible.

The method 500 as shown in FIG. 5A and discussed above involves displaying a zone representation according to the collapsed format unless a determination is made or input is received indicating that the respective playback zone is associated with media content. Alternatively, a method 550 as shown in FIG. 5B may be implemented such that the zone representation may be displayed according to the expanded format unless a determination is made or input is received indicating that the respective playback zone is not associated with media content.

Method 550 shown in FIG. 5B presents an embodiment of a method that can be implemented within an operating environment involving, for example, the media playback system 100 of FIG. 1, one or more of the playback device 200 of FIG. 2, and one or more of the control device 300 of FIG. 3. Method 550 may include one or more operations, functions, or actions as illustrated by one or more of blocks 552-556. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 552, the method 550 involves displaying an expanded format representation of a playback zone. Block 552 may be similar to block 506 discussed above in connection to method 500. As such, discussions relating to block 506 above may also apply to block 552.

At block 554, the method 550 involves determining whether the playback zone is associated with any media content. Block 554 may be similar to block 504 discussed above in connection to method 500. As such, discussions relating to block 506 above may also apply to block 554.

As shown in FIG. 5B, if at block 554 a determination is made that the playback zone is associated with media content, the method 550 may proceed back to block 552 where an expanded format representation of the playback zone is provided. If on the other hand, a determination is made that the playback zone is not associated with any media content, the method 550 may proceed to block 556.

At block 556, the method 550 involves displaying a collapsed format representation of the playback zone. As indicated by block 554, the display of the collapsed format representation of the playback may be based on, or in response to a determination that the playback zone is not associated with media content. Block 556 may be similar to block 502 discussed above in connection to method 500. As such, discussions relating to block 502 above may also apply to block 556.

As indicated above, method 550 may be implemented as an alternative to method 500 such that a zone representation may be displayed according to the expanded format unless a determination is made or input is received indicating that the respective playback zone is not associated with media content, rather than displaying the zone representation according to the collapsed format unless a determination is made or input is received indicating that the respective playback zone is associated with media content. In some embodiments, the methods 500 and 550 may be combined to some extent. In one case, the concepts of method 550 may be implemented as an extension to the method 500. For instance, a block 554' similar to block 554 may be executed subsequent to block 506, which as indicated above, may be similar to block 552. In this example, if at block 554', a determination is made that the playback zone is associated with media content, the method 500 may proceed back to block 506. On the other hand, if at block 554', a determination is made that the playback zone is not associated with any media content, the method 500 may proceed to a block 556' that is similar to block 556, or back to block 502. As such, an iterative process for displaying the expanded format representation of a playback zone when the playback zone is associated with media content, and displaying the collapsed format representation of the playback zone when the playback zone is not associated with media content may be provided. As discussed, a default representation for the playback zone in this case may be the collapsed format representation.

Analogously, in another case, the concepts of method 500 may be implemented as an extension to the method 550. For instance, a block 504' similar to block 504 may be executed subsequent to block 556, which as indicated above, may be similar to block 502. In this example, if at block 504', a determination is made that the playback zone is not associated with any media content, the method 500 may proceed back to block 556. On the other hand, if at block 504', a determination is made that the playback zone is associated with media content, the method 500 may proceed to a block 506' that is similar to block 506, or back to block 552. As such, an iterative process for displaying the collapsed format representation of a playback zone when the playback zone is not associated with any media content, and displaying the expanded format representation of the playback zone when the playback zone is associated with media content may be provided. As discussed, a default representation for the playback zone in this case may be the expanded format representation. Other examples are also possible.

For illustration purposes, FIG. 6C shows a third example of playback zone representations 602', 604, and 606' on the interface 600. In this example, a determination may have been made that the Living Room zone is associated with first media content, the Dining Room zone is not associated with media content, and the Kitchen zone is playing second media content. As shown, expanded format representation 602' may be provided on the interface 600, displaying information 612 associated with the first media content, which has example track title "Track 676," by example artist "Artist 45," along with example art associated with the first media content.

Because the Dining Room zone is not associated with any media content, the collapsed format representation 604 previously discussed in connection to FIG. 6A may be provided directly below the expanded zone representation 602'. In this case, because the expanded format representation 602' is larger than the collapsed format representation 602 shown in FIG. 6A, the zone representation 604 in FIG. 6C may be displayed at a position that is relatively lower on the interface 600 than the zone representation 604 is on the interface 600 shown in FIG. 6A.

As also shown in FIG. 6A, expanded format representation 606' may be provided on the interface 600, displaying information 616 associated with the second media content, which has example track title "Track 796," by the example artist "Artist 23," along with example art associated with the second media content. In this example, because the second media content is being played in the Kitchen zone, an icon 626 may be provided in the expanded format representation 606' indicating that one or more playback devices in the Kitchen zone is playing media content.

While the expanded format representations 602' and 606' shown in FIG. 6C appear to have the same expanded format dimensions, one having ordinary skill in the art will appreciate that in some embodiments, the expanded format representations may vary in sizes. For instance, if album art or certain information is not available for particular media content, a more compact expanded format representation may be provided rather than displaying blank or generic place holders for the unavailable information. The compact expanded format representation may be provided alongside a fully expanded format representation of a playback zone associated media content for which all the displayed metadata is available. In some cases, the unavailable information may be due to incomplete metadata, while in some other cases, such as if the playback zone is associated with streaming Internet radio, fewer pieces of relevant information may exist to be displayed. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

As indicated above, the present application involves displaying playback zone representations in a controller interface for a media playback system. In one aspect, a method is provided. The method involves displaying a collapsed format representation of a playback zone in a media playback system, and based on a determination that the playback zone is associated with media content, displaying an expanded format representation of the playback zone. The expanded format representation of the playback zone is larger than the collapsed format representation of the playback zone.

In another aspect, a device is provided. The device includes a processor and memory having stored thereon instructions executable by the processor to cause the device to perform functions. The functions include displaying an expanded format representation of a playback zone in a media playback system, and based on a determination that the playback zone is not associated with media content, displaying a collapsed format representation of the playback zone. The collapsed format representation of the playback zone is smaller than the expanded format representation of the playback zone.

In yet another aspect, a non-transitory computer readable memory is provided. The non-transitory computer readable memory has stored thereon instructions executable by a computing device to cause the computing device to perform functions. The functions include displaying a representation of a first playback zone in a media playback system according to a collapsed format, and displaying a representation of a second playback zone in the media playback system. The representation of the second playback zone is in a position directly below the representation of the first playback zone. The functions also include based on a determination that the first playback zone is associated with media content, (i) displaying an updated representation of the first playback zone according to an expanded format, and (ii) moving the representation of the second playback zone to be displayed in a position directly below the updated representation of the first playback zone. The expanded format is larger than the collapsed format.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. Tangible, non-transitory computer-readable media having stored thereon instructions that, when executed by one or more processors of a computing device, cause the computing device to perform functions comprising:
   receiving a command to display representations of playback zones in a media playback system;
   after receiving the command, determining that (i) each zone of a first subset of playback zones in the media playback system is associated with media content and (ii) each zone of a second subset of playback zones in the media playback system is not associated with media content;
   in response to determining that each zone of the first subset of playback zones in the media playback system is associated with media content, displaying an expanded format representation of each playback zone in the first subset; and
   in response to determining that each zone of the second subset of playback zones in the media playback system is not associated with media content, displaying a collapsed format representation of each playback zone in the second subset.

2. The tangible, non-transitory computer-readable medium of claim 1, wherein displaying the expanded format representation of each playback zone in the first subset comprises:
   displaying in each expanded format representation, a representation of respective media content associated with the corresponding playback zone.

3. The tangible, non-transitory computer-readable medium of claim 1, wherein determining that each zone of the first subset of playback zones in the media playback system is associated with media content comprises:
   determining that at least one playback zone in the first subset of playback zones is playing media content.

4. The tangible, non-transitory computer-readable medium of claim 1, wherein determining that the first subset of playback zones in the media playback system is associated with media content comprises:
   determining that at least one playback zone in the first subset of playback zones corresponds to a playback queue populated with media content.

5. The tangible, non-transitory computer-readable medium of claim 1, wherein displaying the expanded format representation of each playback zone in the first subset comprises displaying in each expanded format representation, a representation of a name of the corresponding playback zone in the first subset of playback zones, and wherein displaying the collapsed format representation of each playback zone in the second subset comprises displaying in each collapsed format representation, a representation of a name of the corresponding playback zone in the second subset of playback zones.

6. The tangible, non-transitory computer-readable medium of claim 1, wherein the functions further comprise:
   after displaying the expanded format representation of each playback zone in the first subset and the collapsed format representation of each playback zone in the second subset, determining that (i) each zone of a third subset of playback zones in the media playback system is associated with media content and (ii) each zone of a fourth subset of playback zones in the media playback system is not associated with media content, wherein the third subset is different from the first subset and the fourth subset is different from the second subset;

in response to determining that each zone of the third subset of playback zones in the media playback system is associated with media content, displaying an expanded format representation of each playback zone in the third subset; and in response to determining that each zone of the second subset of playback zones in the media playback system is not associated with media content, displaying a collapsed format representation of each playback zone in the fourth subset.

7. The tangible, non-transitory computer-readable medium of claim 1, wherein two or more particular playback zones in the first subset are arranged into a zone group, and wherein displaying the expanded format representation of each playback zone in the first subset comprises:

displaying in the expanded format representation of the zone group, representations indicating the two or more particular playback zones.

8. The tangible, non-transitory computer-readable medium of claim 1, wherein two or more particular playback zones in the second subset are arranged into a zone group, and wherein displaying a collapsed format representation of each playback zone in the second subset comprises:

displaying in the collapsed format representation of the zone group, representations indicating the two or more particular playback zones.

9. A method comprising:

receiving, via a computing device, a command to display representations of playback zones in a media playback system;

after receiving the command, determining, via the computing device, that (i) each zone of a first subset of playback zones in the media playback system is associated with media content and (ii) each zone of a second subset of playback zones in the media playback system is not associated with media content;

in response to determining that each zone of the first subset of playback zones in the media playback system is associated with media content, displaying by the computing device, an expanded format representation of each playback zone in the first subset; and in response to determining that each zone of the second subset of playback zones in the media playback system is not associated with media content, displaying by the computing device, a collapsed format representation of each playback zone in the second subset.

10. The method of claim 9, wherein displaying the expanded format representation of each playback zone in the first subset comprises:

displaying in each expanded format representation, a representation of respective media content associated with the corresponding playback zone.

11. The method of claim 9, wherein determining that each zone of the first subset of playback zones in the media playback system is associated with media content comprises:

determining that at least one playback zone in the first subset of playback zones is playing media content.

12. The method of claim 9, wherein determining that each zone of the first subset of playback zones in the media playback system is associated with media content comprises:

determining that at least one playback zone in the first subset of playback zones corresponds to a playback queue populated with media content.

13. The method of claim 9, wherein displaying the expanded format representation of each playback zone in the first subset comprises displaying in each expanded format representation, a representation of a name of the corresponding playback zone in the first subset of playback zones, and wherein displaying the collapsed format representation of each playback zone in the second subset comprises displaying by the computing device, in each collapsed format representation, a representation of a name of the corresponding playback zone in the second subset of playback zones.

14. The method of claim 9, wherein the method further comprises:

after displaying the expanded format representation of each playback zone in the first subset and the collapsed format representation of each playback zone in the second subset, determining that (i) each zone of a third subset of playback zones in the media playback system is associated with media content and (ii) each zone of a fourth subset of playback zones in the media playback system is not associated with media content, wherein the third subset is different from the first subset and the fourth subset is different from the second subset;

in response to determining that each zone of the third subset of playback zones in the media playback system is associated with media content, displaying an expanded format representation of each playback zone in the third subset; and in response to determining that each zone of the second subset of playback zones in the media playback system is not associated with media content, displaying a collapsed format representation of each playback zone in the fourth subset.

15. The method of claim 9, wherein a playback zone in the first subset is a zone group comprising two or more playback zones, and wherein displaying by the computing device, an expanded format representation of each playback zone in the first subset comprises:

displaying by the computing device, in the expanded format representation of the zone group, representations indicating the two or more playback zones.

16. The method of claim 9, wherein a playback zone in the second subset is a zone group comprising two or more playback zones, and wherein displaying by the computing device, a collapsed format representation of each playback zone in the second subset comprises:

displaying by the computing device, in the collapsed format representation of the zone group, representations indicating the two or more playback zones.

17. A computing device comprising:

one or more processors; and tangible, non-transitory computer-readable medium having stored thereon instructions that, when executed by the one or more processors, cause the computing device to perform functions comprising:

receiving a command to display representations of playback zones in a media playback system;

after receiving the command, determining that (i) each zone of a first subset of playback zones in the media playback system is associated with media content and (ii) each zone of a second subset of playback zones in the media playback system is not associated with media content;

in response to determining that each zone of the first subset of playback zones in the media playback system is associated with media content, displaying an expanded format representation of each playback zone in the first subset; and in response to determining that each zone of the second subset of playback zones in the media playback system is not associated with media content, displaying a collapsed format representation of each playback zone in the second subset.

18. The computing device of claim 17, wherein displaying the expanded format representation of each playback zone in the first subset comprises:

displaying in each expanded format representation, a representation of respective media content associated with the corresponding playback zone.

19. The computing device of claim 17, wherein displaying the expanded format representation of each playback zone in the first subset comprises displaying in each expanded format representation, a representation of a name of the corresponding playback zone in the first subset of playback zones, and wherein displaying the collapsed format representation of each playback zone in the second subset comprises displaying in each collapsed format representation, a representation of a name of the corresponding playback zone in the second subset of playback zones.

20. The computing device of claim 17, wherein the functions further comprise:

after displaying the expanded format representation of each playback zone in the first subset and the collapsed format representation of each playback zone in the second subset, determining that (i) each zone of a third subset of playback zones in the media playback system is associated with media content and (ii) each zone of a fourth subset of playback zones in the media playback system is not associated with media content, wherein the third subset is different from the first subset and the fourth subset is different from the second subset;

in response to determining that each zone of the third subset of playback zones in the media playback system is associated with media content, displaying an expanded format representation of each playback zone in the third subset; and in response to determining that each zone of the second subset of playback zones in the media playback system is not associated with media content, displaying a collapsed format representation of each playback zone in the fourth subset.

* * * * *